United States Patent
Shinohara et al.

(10) Patent No.: US 8,078,462 B2
(45) Date of Patent: Dec. 13, 2011

(54) APPARATUS FOR CREATING SPEAKER MODEL, AND COMPUTER PROGRAM PRODUCT

(75) Inventors: Yusuke Shinohara, Kanagawa (JP);
Masami Akamine, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 687 days.

(21) Appl. No.: 12/244,245

(22) Filed: Oct. 2, 2008

(65) Prior Publication Data

US 2009/0094022 A1    Apr. 9, 2009

(30) Foreign Application Priority Data

Oct. 3, 2007   (JP) .................................. 2007-259564

(51) Int. Cl.
*G10L 15/08* (2006.01)

(52) U.S. Cl. ........ 704/240; 704/250; 704/233; 704/236; 704/228; 704/256.4

(58) Field of Classification Search .................. 704/240, 704/233, 236, 256.4, 256.2, 270, 251, 226–228, 704/246; 345/767; 725/18
See application file for complete search history.

(56) References Cited

U.S. PATENT DOCUMENTS

| | | | |
|---|---|---|---|
| 6,029,124 A * | 2/2000 | Gillick et al. ................. 704/200 |
| 6,539,351 B1 * | 3/2003 | Chen et al. .................... 704/236 |
| 6,591,235 B1 * | 7/2003 | Chen et al. .................... 704/236 |
| 6,633,843 B2 * | 10/2003 | Gong ............................ 704/233 |
| 6,816,836 B2 * | 11/2004 | Basu et al. ..................... 704/270 |
| 6,944,590 B2 * | 9/2005 | Deng et al. .................... 704/228 |
| 7,139,703 B2 * | 11/2006 | Acero et al. ................... 704/228 |
| 7,228,279 B2 * | 6/2007 | Chaudhari et al. ............ 704/273 |
| 7,457,745 B2 * | 11/2008 | Kadambe et al. ............. 704/216 |
| 7,523,034 B2 * | 4/2009 | Deligne et al. ................ 704/251 |
| 7,603,276 B2 * | 10/2009 | Yoshizawa ................. 704/256.2 |
| 2002/0135618 A1 * | 9/2002 | Maes et al. .................... 345/767 |
| 2002/0165713 A1 * | 11/2002 | Skoglund et al. ............. 704/240 |
| 2003/0018475 A1 * | 1/2003 | Basu et al. ..................... 704/270 |
| 2006/0053014 A1 * | 3/2006 | Yoshizawa ................. 704/256.4 |
| 2006/0075422 A1 * | 4/2006 | Choi et al. ....................... 725/18 |
| 2008/0208581 A1 * | 8/2008 | Pelecanos et al. ............. 704/250 |
| 2008/0300875 A1 * | 12/2008 | Yao et al. ....................... 704/236 |
| 2009/0228272 A1 * | 9/2009 | Herbig et al. ................. 704/233 |

* cited by examiner

*Primary Examiner* — Vijay Chawan

(74) *Attorney, Agent, or Firm* — Turocy & Watson, LLP (57) ABSTRACT

A transformation-parameter calculating unit calculates a first model parameter indicating a parameter of a speaker model for causing a first likelihood for a clean feature to maximum, and calculates a transformation parameter for causing the first likelihood to maximum. The transformation parameter transforms, for each of the speakers, a distribution of the clean feature corresponding to the identification information of the speaker to a distribution represented by the speaker model of the first model parameter. A model-parameter calculating unit transforms a noisy feature corresponding to identification information for each of speakers by using the transformation parameter, and calculates a second model parameter indicating a parameter of the speaker model for causing a second likelihood for the transformed noisy feature to maximum.

5 Claims, 4 Drawing Sheets

APPARATUS FOR CREATING SPEAKER MODEL, AND COMPUTER PROGRAM PRODUCT

CROSS-REFERENCE TO RELATED APPLICATIONS

This application is based upon and claims the benefit of priority from the prior Japanese Patent Application No. 2007-259564, filed on Oct. 3, 2007; the entire contents of which are incorporated herein by reference.

BACKGROUND OF THE INVENTION

1. Field of the Invention

The present invention relates to an apparatus and a computer program product for creating a standard speaker model representing a distribution of features extracted from a speech of a standard speaker.

2. Description of the Related Art

In speech recognition apparatuses for recognizing various speakers' speeches, a recognition rate of a specific speaker may be remarkably lower than recognition rates of other speakers. Speaker normalization has been widely known as a technology for overcoming the above problem. In the speaker normalization, speaker characteristics of a feature vector are normalized by transforming the feature vector extracted from a speech in a predetermined manner.

In "Adaptive training using simple target models", Stemmer et al., in Proceedings of the International Conference on Acoustics, Speech, and Signal Processing (ICASSP), 2005 has disclosed a technology for normalizing a feature vector by using an approach called constrained maximum likelihood linear regression (CMLLR). The CMLLR needs a standard speaker model representing a distribution of feature vectors of a standard speaker. The feature vectors are transformed so that a series of the feature vectors conforms to the standard speaker model as much as possible.

The standard speaker model is, for example, a Gaussian mixture model (GMM). "Speaker adaptive training: a maximum likelihood approach to speaker normalization", Anastasakos et al., in Proceedings of ICASSP, 1997 and "Maximum likelihood linear transformations for HMM-based speech recognition", Gales, Computer Speech and Language, vol. 12, 1998 has disclosed a technology for calculating GMM parameters including a mixing coefficient, a mean vector, and a covariance matrix of a mixture by using an approach called speaker adaptive training method, and creating the standard speaker model using the GMM parameters. In the speaker adaptive training method, a transformation parameter for speaker normalization and the GMM parameters for obtaining a maximum likelihood for training data are calculated by using an expectation-maximization (EM) algorithm.

A typical speech recognition system is assumed to work in a noisy environment. Therefore, it is recommended to create the standard speaker model from training data recorded in the noisy environment like the actual working environment. If training data recorded in a noiseless environment is used, the accuracy of speech recognition decreases due to mismatch between the training environment and the test environment.

However, if feature vectors extracted from a speech that is recorded in the noisy environment are used as the training data for the speaker normalization disclosed in Stemmer et al., an incorrect transformation parameter for speaker normalization is calculated in the speaker adaptive training method. This is because a fluctuation in the feature vectors due to noises makes a fluctuation in the feature vectors due to the speaker characteristics hidden. As a result, incorrect GMM parameters are calculated as well as the transformation parameter for speaker normalization. In other words, if the training data recorded in the noisy environment is used to prevent occurrence of mismatch between the training environment and the test environment, the standard speaker model can not be created stably.

SUMMARY OF THE INVENTION

According to one aspect of the present invention, an apparatus for creating a speaker model that represents a distribution of features extracted from a speech of a standard speaker, the apparatus includes a first storage unit configured to correspondingly store identification information for identifying each of the speakers and a clean feature representing a feature of a speech of the speaker recorded in a noiseless environment; a second storage unit configured to correspondingly store the identification information and a noisy feature representing a feature of a speech of the speaker recorded in a noisy environment; a transformation-parameter calculating unit configured to calculate a first model parameter indicating a parameter of the speaker model for causing a first likelihood for the clean feature to maximum, and calculates a transformation parameter for causing the first likelihood to maximum, the transformation parameter transforming, for each of the speakers, a distribution of the clean feature corresponding to the identification information of the speaker to a distribution represented by the speaker model of the first model parameter; and a model-parameter calculating unit configured to transform the noisy feature corresponding to the identification information for each of the speakers by using the transformation parameter, and calculates a second model parameter indicating a parameter of the speaker model for causing a second likelihood for the transformed noisy feature to maximum.

According to another aspect of the present invention, a computer program product having a computer readable medium including programmed instructions for creating a speaker model that represents a distribution of features extracted from a speech of a standard speaker, wherein the instructions, when executed by a computer, cause the computer to perform: calculating a first model parameter indicating a parameter of the speaker model for causing a first likelihood for the clean feature representing a feature of a speech of the speaker recorded in a noiseless environment to maximum, and calculating a transformation parameter for causing the first likelihood to maximum, the transformation parameter transforming, for each of the speakers, a distribution of the clean feature corresponding to the identification information for identifying each of the speakers to a distribution represented by the speaker model of the first model parameter; and transforming a noisy feature representing a feature of a speech of the speaker recorded in a noisy environment corresponding to the identification information for each of the speakers by using the transformation parameter, and calculating a second model parameter indicating a parameter of the speaker model for causing a second likelihood for the transformed noisy feature to maximum.

DETAILED DESCRIPTION OF THE INVENTION

Exemplary embodiments of the present invention are described in detail below with reference to the accompanying drawings.

A speaker-model creating apparatus according to an embodiment of the present invention calculates a transformation parameter for speaker normalization from a clean feature that is extracted from a speech recorded in a noiseless environment (hereinafter, "clean training data"), and creates a standard-speaker model from the calculated transformation parameter for speaker normalization and a noisy feature that is extracted from a speech recorded in a noisy environment (hereinafter, "noisy training data").

Figure 1:
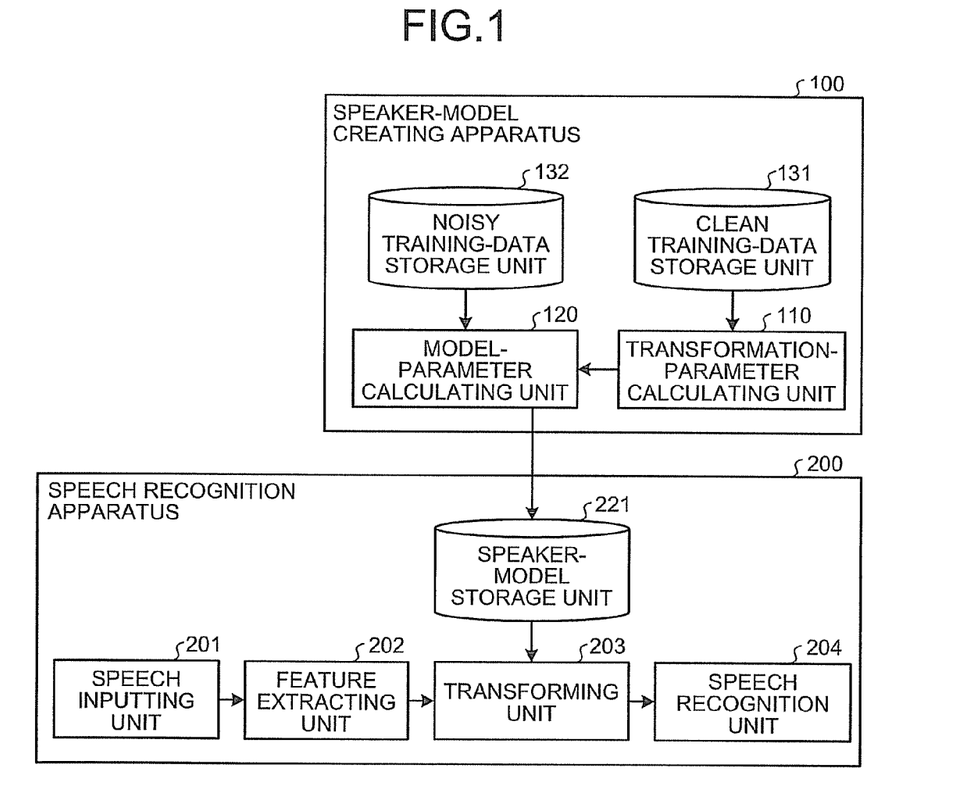
FIG. 1 is a block diagram of a speaker-model creating apparatus and a speech recognition apparatus according to an embodiment of the present invention.

FIG. 1 is a block diagram of a speaker-model creating apparatus 100 and a speech recognition apparatus 200 according to an embodiment of the present invention. The speech recognition apparatus 200 recognizes a speech with a standard speaker model created by the speaker-model creating apparatus 100.

The structure of the speech recognition apparatus 200 is described before an explanation about a speech recognition process by using the standard speaker model. As shown in FIG. 1, the speech recognition apparatus 200 includes a speaker-model storage unit 221, a speech inputting unit 201, a feature extracting unit 202, a transforming unit 203, and a speech recognition unit 204.

The speaker-model storage unit 221 stores therein parameters of the standard speaker model created by the speaker-model creating apparatus 100. The standard speaker model is a Gaussian mixture model (GMM). The speaker-model storage unit 221 stores therein, more particularly, GMM parameters including a mixing coefficient, a mean vector, and a covariance matrix of a mixture.

The speech inputting unit 201 receives a speech signal via a microphone or the like.

The feature extracting unit 202 extracts a feature vector indicative of a feature from the received speech signal. Specifically, the feature extracting unit 202 cuts the speech signal into short-time frames by gradually shifting a window, transforms each of the short-time frames into the feature vector, and outputs a temporal sequence of the feature vectors. The feature extracting unit 202 can be configured to extract any type of feature vectors by using a widely-known approach such as a Mel-frequency cepstrum coefficient (MFCC) or a perceptual linear prediction (PLP).

The transforming unit 203 transforms the extracted feature vector using the affine transformation, thereby normalizing speaker characteristics of a feature vector of the received speech. The transforming unit 203 uses the CMLLR for estimation and execution of the transformation. In other words, the transforming unit 203 transforms the feature vector so that a series of feature vectors conforms to the standard speaker model stored in the speaker-model storage unit 221 as much as possible.

The speech recognition unit 204 recognizes the speech by comparing the temporal series of the transformed featured vectors with a standard pattern of phoneme, and outputs a result of recognition. Any widely-known approaches such as a hidden Markov model (HMM), a neural network, and a dynamic programming matching can be used in the speech recognition process performed by the speech recognition unit 204.

In this manner, the speech recognition process is performed after the feature vector is transformed by using the pre-trained standard speaker model. Therefore, the speaker characteristics of the feature vector are normalized correctly, which increases the accuracy of speech recognition.

The structure of the speaker-model creating apparatus 100 that creates the standard speaker model is described below. As shown in FIG. 1, the speaker-model creating apparatus 100 includes a clean training-data storage unit 131, a noisy training-data storage unit 132, a transformation-parameter calculating unit 110, and a model-parameter calculating unit 120.

The clean training-data storage unit 131 stores therein the clean training data indicative of a set of feature vectors extracted from speech data of a predetermined group of speakers recorded in the noiseless environment. On the other hands, the noisy training-data storage unit 132 stores therein the noisy training data indicative of a set of feature vectors extracted from speech data of the same group of speakers recorded in the noisy environment.

The clean training data is created from, for example, speech data recorded in a quiet environment or speech data recorded with a close-talking microphone. The speech data is collected from a plurality of speakers instead of a single speaker. The training data is created in the same manner as extracting the feature vector by the feature extracting unit 202 of the speech recognition apparatus 200. The feature vectors as the training data can be arbitrary features of speech such as an MFCC or a PLP.

The noisy training data is created from noisy speech data in the same manner as creating the clean training data. The noisy speech data is created by artificially adding noises to the clean training data or by recording the speech in the noisy environment. It is noted that the noisy speech data is collected from the same group of speakers from whom the clean training data is collected.

Figure 2:
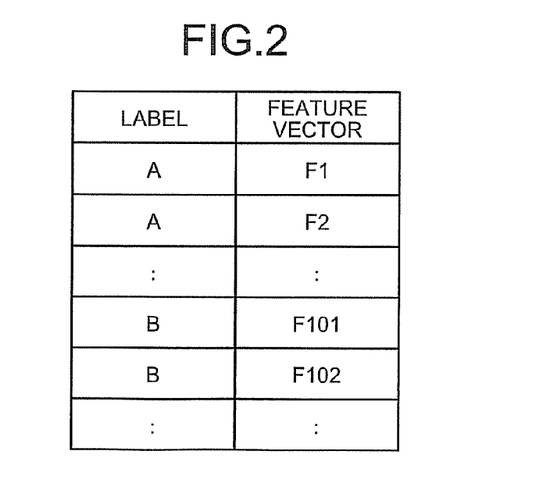
FIG. 2 is a diagram illustrating an exemplary data structure of training data.

As shown in FIG. 2, the training data includes label and feature vector. The label is information for identifying each speaker; the feature vector is information extracted from speech data of a speaker corresponding to the label.

The transformation-parameter calculating unit 110 creates a standard speaker model from the clean training data and calculates a transformation parameter for speaker normalization (hereinafter, "transformation parameter") from the clean training data. More particularly, the transformation-parameter calculating unit 110 calculates, using the speaker adaptive training method disclosed in Anastasakos et al., a transformation parameter and GMM parameters for maximizing the likelihood for the clean training data.

Because the transformation-parameter calculating unit 110 uses the clean training data, the calculated transformation parameter is correct since no fluctuation in the feature vectors due to noises makes a fluctuation in the feature vectors due to the speaker characteristics hidden. As for the standard speaker model created along with the transformation parameter, however, the accuracy of speech recognition may decrease due to the mismatch between the training environment and the test environment.

Consequently, the model-parameter calculating unit 120 creates a standard speaker model capable of improving a precision of speech recognition by further calculating parameters of the standard speaker model adaptive for the test environment, using the noisy training data and the transformation parameter calculated by the transformation-parameter calculating unit 110.

More particularly, the model-parameter calculating unit 120 calculates, by using the EM algorithm, GMM parameters for maximizing the likelihood for the noisy training data. The transformation parameter that is created by the transformation-parameter calculating unit 110 is not updated by the model-parameter calculating unit 120 with the EM algorithm. In other words, the model-parameter calculating unit 120 executes the EM algorithm so that only the GMM parameters are updated.

Figure 3:
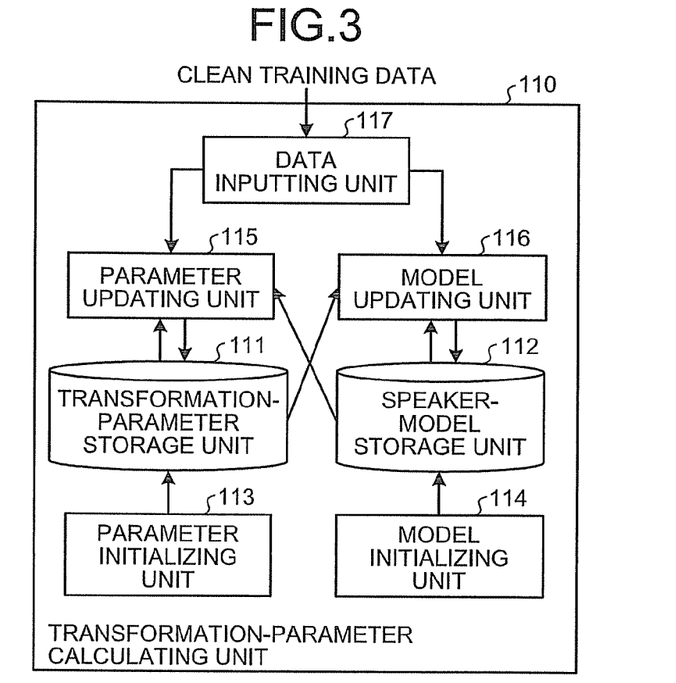
FIG. 3 is a detailed block diagram of a transformation-parameter calculating unit.

The structure of the transformation-parameter calculating unit 110 is described in detail below. As shown in FIG. 3, the transformation-parameter calculating unit 110 includes a transformation-parameter storage unit 111, a speaker-model storage unit 112, a parameter initializing unit 113, a model initializing unit 114, a parameter updating unit 115, a model updating unit 116, and a data inputting unit 117.

The data inputting unit 117 receives the clean training data from the clean training-data storage unit 131, and sends the received clean training data to both the parameter updating unit 115 and the model updating unit 116.

The transformation-parameter storage unit 111 stores therein the transformation parameter corresponding to each speaker. In the present embodiment, the affine transformation represented by following Equation (1) is used for the speaker normalization:

$$x'=Ax+b \qquad (1)$$

where x is feature vector to be transformed, x' is transformed feature vector, A is matrix as a parameter defining the affine transformation, and b is vector as a parameter defining the affine transformation. The transformation-parameter storage unit 111 stores therein the parameters for affine transformation corresponding to each speaker as the transformation parameter.

The speaker-model storage unit 112 stores therein the parameters of the standard speaker model calculated by the transformation-parameter calculating unit 110. More particularly, because the standard speaker model is the GMM as described above, the speaker-model storage unit 112 stores therein the GMM parameters including the mixing coefficient, the mean vector, and the covariance matrix of the mixture.

The parameter initializing unit 113 calculates an initial transformation parameter for speaker normalization, and stores the calculated initial transformation parameter in the transformation-parameter storage unit 111. More particularly, for example, the parameter initializing unit 113 stores the matrix A as a unit matrix and the vector b as a zero vector in the transformation-parameter storage unit 111 as the initial values.

The model initializing unit 114 calculates the initial parameters of the standard speaker model, and stores the calculated initial parameters into the speaker-model storage unit 112. More particularly, the model initializing unit 114, for example, divides a set of feature vectors extracted from the received training data into k number of subsets by using k-means clustering. The model initializing unit 114 then calculates the mean vector and the covariance matrix of each subset, thereby creating k number of Gaussian distributions. The model initializing unit 114 calculates the Gaussian mixing coefficient in proportion to a size of each subset. In this manner, the parameters of GMM with k mixture components are set as the initial parameters of the standard speaker model.

Although the model initializing unit 114 calculates the initial parameters of the standard speaker model in the above approach, any widely-known approaches can be used instead of the above approach. For example, the model initializing unit 114 can be configured to divide the feature vectors by using another clustering instead of the k-means clustering.

The parameter updating unit 115 reads the clean training data, the parameters of the standard speaker model, and the transformation parameter, updates the transformation parameter by using the EM algorithm, and writes back the updated transformation parameter to the transformation-parameter storage unit 111. More particularly, the parameter updating unit 115 calculates the transformation parameter for increasing the likelihood for the clean training data, and updates the transformation parameter stored in the transformation-parameter storage unit 111 to the calculated value.

The model updating unit 116 reads the clean training data, the parameters of the standard speaker model, and the transformation parameter, updates the parameters of the standard speaker model by using the EM algorithm, and writes back the updated parameters of the standard speaker model to the speaker-model storage unit 112. More particularly, the model updating unit 116 calculates the parameters of the standard speaker model for increasing the likelihood for the clean training data, and updates the parameters of the standard speaker model stored in the speaker-model storage unit 112 to the calculated value.

The model updating unit 116 transforms the feature vector extracted from the clean training data by using the transformation parameter corresponding to the speaker. The model updating unit 116 then calculates the parameters of the standard speaker model for increasing the likelihood for the transformed clean training data.

Figure 4:
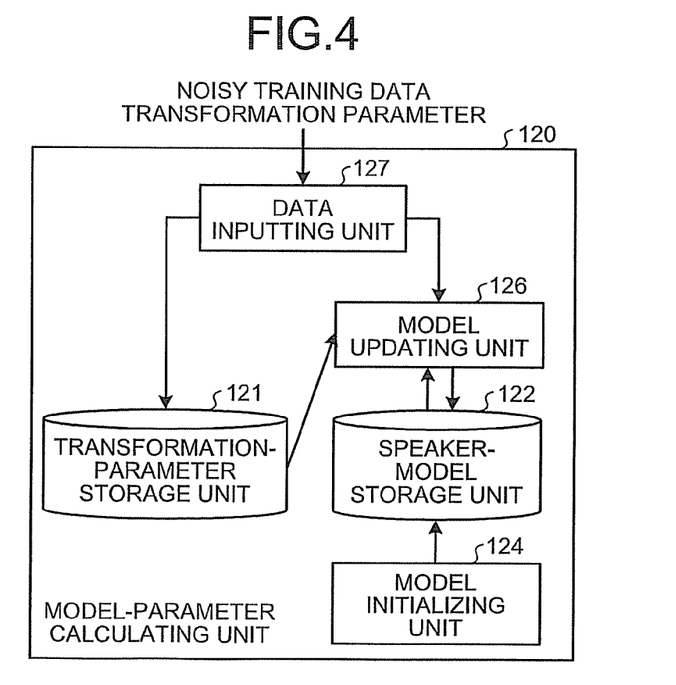
FIG. 4 is a detailed block diagram of a model-parameter calculating unit.

The structure of the model-parameter calculating unit 120 is described in detail below. As shown in FIG. 4, the model-parameter calculating unit 120 includes a transformation-parameter storage unit 121, a speaker-model storage unit 122, a model initializing unit 124, a model updating unit 126, and a data inputting unit 127.

The data inputting unit 127 receives the noisy training data from the noisy training-data storage unit 132 and the transformation parameter from the transformation-parameter storage unit 111 of the transformation-parameter calculating unit 110.

The transformation-parameter storage unit 121 receives the transformation parameter from the data inputting unit 127, and stores therein the transformation parameter corresponding to each speaker. In other words, the transformation-parameter storage unit 121 stores therein the parameters for affine transformation (i.e., the matrix A and the vector b as the constant term, both corresponding to each speaker).

The speaker-model storage unit 122 stores therein the parameters of the standard speaker model calculated by the model-parameter calculating unit 120. More particularly, the speaker-model storage unit 122 stores therein the GMM parameters including the mixing coefficient, the mean vector, and the covariance matrix of the mixture.

The model initializing unit 124 calculates the initial parameters of the standard speaker model, and stores the calculated initial parameters into the speaker-model storage unit 122. The model initializing unit 124 transforms the feature vector extracted from the noisy training data by using the transformation parameter corresponding to the speaker. As a result of the transformation, noisy training data having normalized speaker characteristics is created. The model initializing unit 124 divides a set of feature vectors extracted from the normalized noisy training data into k number of subsets by using the k-means clustering. The model initializing unit 124 then calculates the mean vector and the covariance matrix of each subset, thereby creating k number of Gaussian distributions. The model initializing unit 124 calculates the Gaussian mixing coefficient in proportion to a size of each subset. In this manner, the parameters of GMM with k mixture components are set as the initial parameters of the standard speaker model.

The model updating unit 126 reads the noisy training data, the parameters of the standard speaker model, and the transformation parameter, updates the parameters of the standard speaker model by using the EM algorithm, and writes back the updated parameters of the standard speaker model to the speaker-model storage unit 122. More particularly, the model updating unit 126 calculates the parameters of the standard speaker model for increasing the likelihood for the noisy training data, and updates the parameters of the standard speaker model stored in the speaker-model storage unit 122 to the calculated value.

Those storage units such as the transformation-parameter storage unit 111, the speaker-model storage unit 112, the transformation-parameter storage unit 121, the speaker-model storage unit 122, the clean training-data storage unit 131, the noisy training-data storage unit 132, and the speaker-model storage unit 221 can be any type of widely-used recording medium such as a hard disk drive (HDD), an optical disc, a memory card, and a random access memory (RAM).

A speaker-model creating process performed by the speaker-model creating apparatus 100 is described with reference to FIG. 5.

Figure 5:
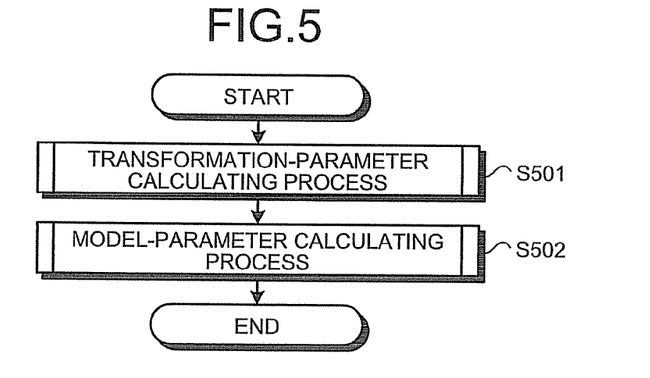
FIG. 5 is a general flowchart of a speaker-model creating process according to the embodiment.

As shown in FIG. 5, the speaker-model creating process includes a transformation-parameter calculating process (Step S501) at which the transformation-parameter storage unit 111 calculates the transformation parameter from the clean training data, and a model-parameter calculating process (Step S502) at which the model-parameter calculating unit 120 calculates the parameters of the standard speaker model from the noisy training data and the transformation parameter. The transformation-parameter calculating process and the model-parameter calculating process are described in detail below.

Figure 6:
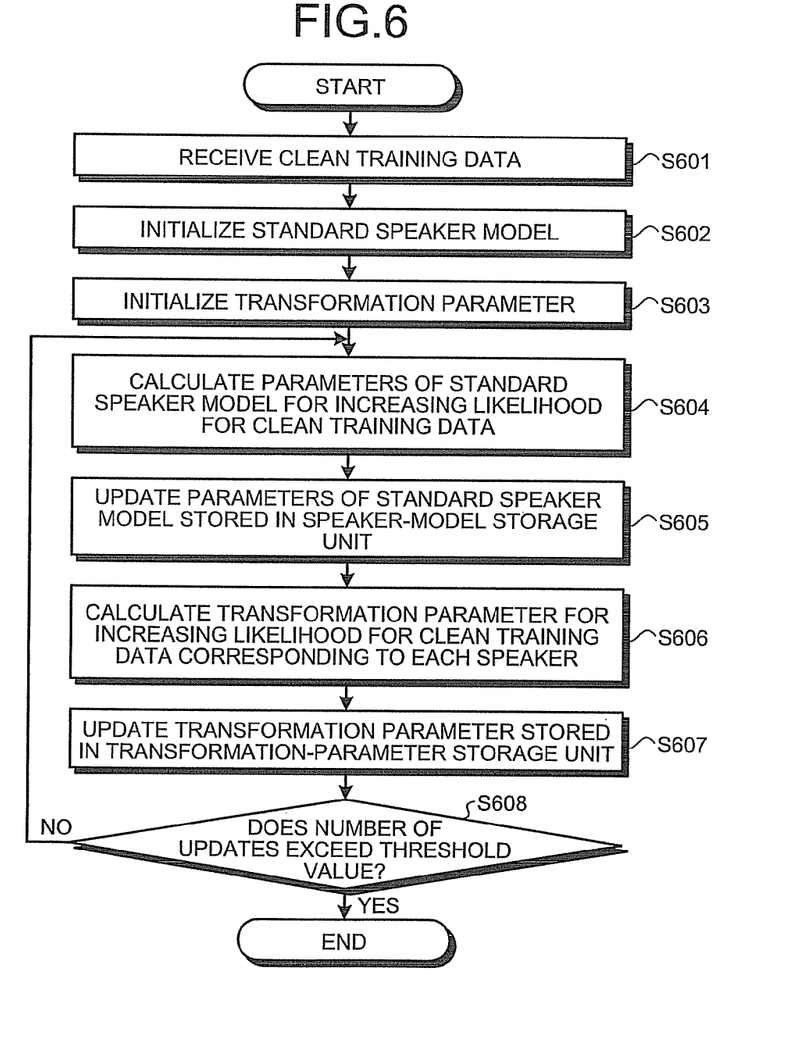
FIG. 6 is a detailed flowchart of a transformation-parameter calculating process.

The transformation-parameter calculating process at Step S501 is described in detail below with reference to FIG. 6.

The data inputting unit 117 receives the clean training data from the clean training-data storage unit 131 (Step S601). The model initializing unit 114 calculates the initial parameters of the standard speaker model (Step S602). As described above, for example, the model initializing unit 114 divides a set of feature vectors into k number of subsets by using the k-means clustering thereby creating a GMM with k mixture components, and calculates parameters of the GMM with k mixture components as the initial parameters of the standard speaker model.

The parameter initializing unit 113 calculates the initial value of the transformation parameter (Step S603). More particularly, for example, the parameter initializing unit 113 stores the matrix A as a unit matrix and the vector b as a zero vector in the transformation-parameter storage unit 111 as the initial values.

The transformation-parameter calculating unit 110 calculates the transformation parameter for maximizing the likelihood for the clean training data by repeating a series of processes from Step S604 to Step S607 based on the speaker adaptive training method.

The model updating unit 116 calculates the parameters of the standard speaker model for increasing the likelihood for the received clean training data (Step S604). More particularly, the model updating unit 116 transforms the feature vector extracted from the clean training data by using the transformation parameter corresponding to the speaker. The model updating unit 116 then calculates the parameters of the standard speaker model for increasing the likelihood of the standard speaker model for the transformed clean training data.

The model updating unit 116 updates the parameters of the standard speaker model stored in the speaker-model storage unit 112 to the calculated parameters of the standard speaker model (Step S605).

The parameter updating unit 115 calculates the transformation parameter for increasing the likelihood for the received clean training data corresponding to each speaker (Step S606).

The parameter updating unit 115 updates the transformation parameter stored in the transformation-parameter storage unit 111 to the calculated transformation parameter (Step S607).

The transformation-parameter calculating unit 110 determines whether the number of updates exceeds a predetermined threshold value (Step S608). It is noted that the threshold value is set to an iteration count in the speaker adaptive training method at which the value of the transformation parameter is expected to converge.

When the number of updates does not exceed the threshold value (No at Step S608), the process control returns to Step S604 to repeat the process of calculating the parameters of the standard speaker model performed by the model updating unit 116. When the number of updates exceeds the threshold value (Yes at Step S608), the process control ends the transformation-parameter calculating process.

It is possible to determine whether the speaker adaptive training method has completed based on a result of determination whether the transformation parameter has converged, instead of a result of determination whether the number of updates exceeds the threshold value.

Figure 7:
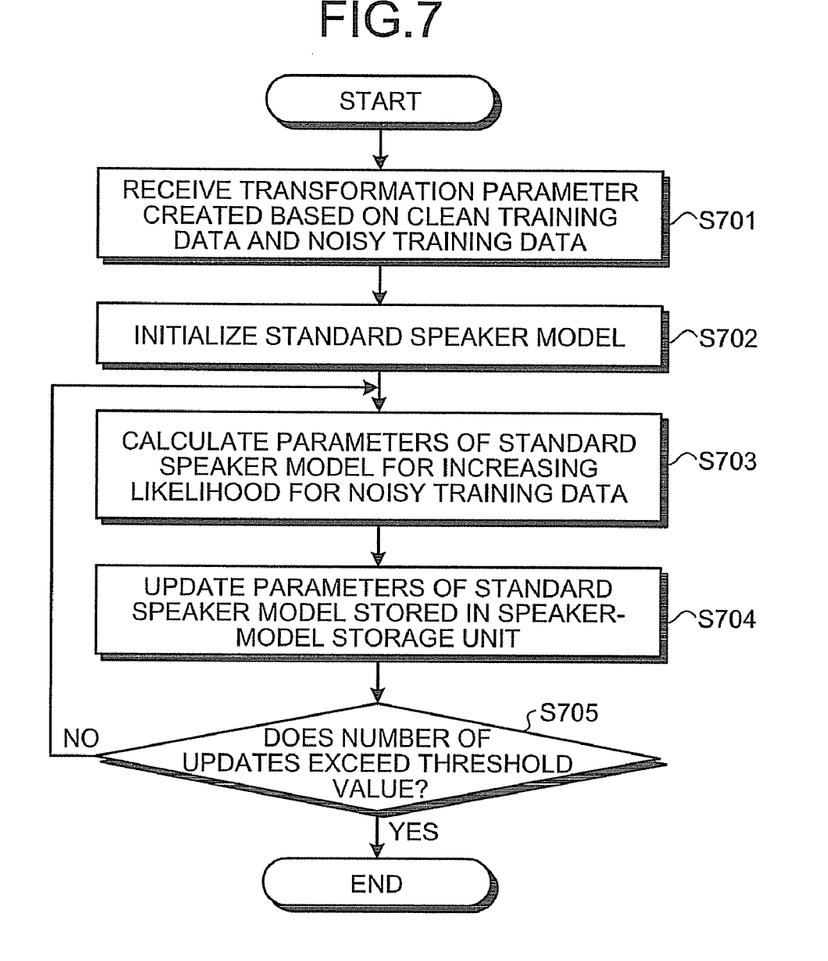
FIG. 7 is a detailed flowchart of a model-parameter calculating process.

The model-parameter calculating process at Step S502 is described in detail below with reference to FIG. 7.

The data inputting unit 127 receives the noisy training data from the noisy training-data storage unit 132, and receives the transformation parameter obtained through the transformation-parameter calculating process from the transformation-parameter calculating unit 110 (Step S701). The data inputting unit 127 stores the received transformation parameter in the transformation-parameter storage unit 121.

The model initializing unit 124 calculates the initial parameters of the standard speaker model (Step S702). More particularly, the model initializing unit 124 transforms the feature vector extracted from the noisy training data by using the transformation parameter. The model initializing unit 124 divides the transformed noisy training data into k number of subsets by using the k-means clustering thereby creating a GMM with k mixture components, and calculates parameters of the GMM with k mixture components as the initial parameters of the standard speaker model.

The model-parameter calculating unit 120 calculates the parameters of the standard speaker model for maximizing the likelihood for the noisy training data by repeating a series of processes from Step S703 to Step S704 using the EM algorithm.

The model updating unit 126 calculates the parameters of the standard speaker model for increasing the likelihood for the received noisy training data (Step S703). More particularly, the model updating unit 126 transforms the feature vector extracted from the noisy training data by using the transformation parameter corresponding to the speaker. The model updating unit 126 uses the transformation parameter stored in the transformation-parameter storage unit 121. The model updating unit 126 then calculates the parameters of the standard speaker model for increasing the likelihood of the standard speaker model for the transformed noisy training data.

The model updating unit 126 updates the parameters of the standard speaker model stored in the speaker-model storage unit 122 to the calculated parameters of the standard speaker model (Step S704).

The model-parameter calculating unit 120 determines whether the number of updates exceeds a predetermined threshold value (Step S705). When the number of updates does not exceed the threshold value (No at Step S705), the process control returns to Step S703 to repeat the process of calculating the parameters of the standard speaker model performed by the model updating unit 126. When the number of updates exceeds the threshold value (Yes at Step S705), the process control ends the model-parameter calculating process.

In this manner, the speaker-model creating apparatus according to the present embodiment can calculate the correct transformation parameter for speaker normalization corresponding to each speaker while creating the standard speaker model from the noisy training data. Thus, it is possible to create the standard speaker model appropriate for the speech recognition apparatus that recognizes speeches by using the speaker normalization. In other words, the standard speaker model for implementing the high recognition accuracy is created.

Figure 8:
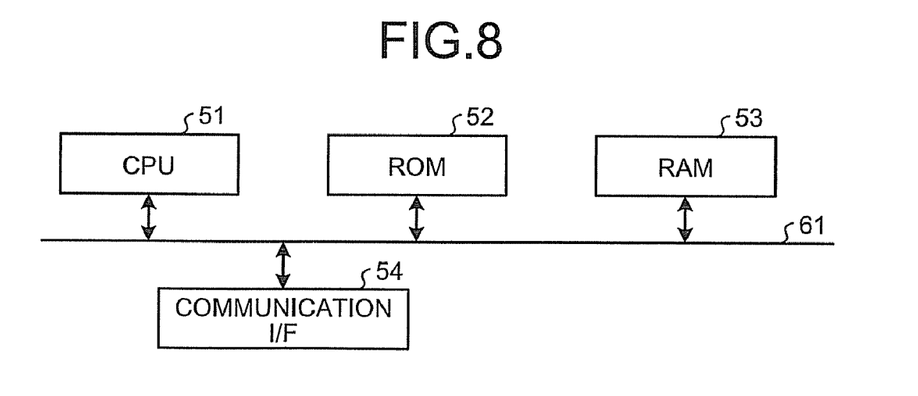
FIG. 8 is a block diagram of hardware structure of the speaker-model creating apparatus according to the embodiment.

The hardware structure of the speaker-model creating apparatus according to the embodiment is described with reference to FIG. 8.

The speaker-model creating apparatus 100 includes a control device such as a central processing unit (CPU) 51, storage devices such as a read only memory (ROM) 52 and a RAM 53, a communication interface (I/F) 54 that communicates with an external device via a network, external storage devices such as an HDD, a compact disc (CD), and other drives, a display device, an input device such as a keyboard or a mouse, and a bus 61 that connects those devices to each other. In other words, the hardware structure of the speaker-model creating apparatus 100 can be designed with a typical computer.

The speaker-model creating program that is executed by the speaker-model creating apparatus 100 is stored, in a form of a file that is installable and executable on a computer, in a computer readable medium readable by the computer, such as a compact disk-read only memory (CD-ROM), a flexible disk (FD), a compact disk-recordable (CD-R), a digital versatile disk (DVD), and a memory. The computer readable medium which stores the speaker-model creating program will be provided as a computer program product.

On the other hand, the speaker-model creating program can be stored in another computer connected to the computer via a network such as the Internet, and downloaded to the computer via the network. The speaker-model creating program can be delivered or distributed via a network such as the Internet.

The speaker-model creating program can be provided, for example, in a state preinstalled into a recording medium such as a ROM.

The speaker-model creating program is, for example, made up of modules that implement those units including the transformation-parameter calculating unit and the model-parameter calculating unit, as software. When the CPU 51 (processor) reads the speaker-model creating program from the recording medium and executes the read speaker-model creating program, the above modules are loaded and created on a main memory thereby implementing those units.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for creating a speaker model that represents a distribution of features extracted from a speech of a standard speaker, the apparatus comprising:
a first storage unit configured to correspondingly store identification information for identifying each of the speakers and a clean feature representing a feature of a speech of the speaker recorded in a noiseless environment;
a second storage unit configured to correspondingly store the identification information and a noisy feature representing a feature of a speech of the speaker recorded in a noisy environment;
a transformation-parameter calculating unit configured to calculate a first model parameter indicating a parameter of the speaker model for causing a first likelihood for the clean feature to maximum, and calculates a transformation parameter for causing the first likelihood to maximum, the transformation parameter transforming, for each of the speakers, a distribution of the clean feature corresponding to the identification information of the speaker to a distribution represented by the speaker model of the first model parameter; and
a model-parameter calculating unit configured to transform the noisy feature corresponding to the identification information for each of the speakers by using the transformation parameter, and calculates a second model parameter indicating a parameter of the speaker model for causing a second likelihood for the transformed noisy feature to maximum.

2. The apparatus according to claim 1, wherein
the speaker model is Gaussian mixture model,
the transformation-parameter calculating unit calculates the first model parameter indicating a parameter of the Gaussian mixture model for causing the first likelihood to maximum, and calculates the transformation parameter for causing the first likelihood to maximum, the transformation parameter transforming, for each of the speakers, a distribution of the clean feature corresponding to the identification information of the speaker to a distribution represented by the Gaussian mixture model of the first model parameter; and
the model-parameter calculating unit calculates the second model parameter indicating a parameter of the Gaussian mixture model for causing the second likelihood to maximum.

3. The apparatus according to claim 1, wherein
the transformation-parameter calculating unit calculates the first model parameter and the transformation parameter by using a speaker adaptive training method, and
the model-parameter calculating unit calculates the second model parameter by using an expectation-maximization algorithm.

4. The apparatus according to claim 3, wherein the model-parameter calculating unit includes
a model initializing unit configured to transform, for each of the speakers, the noisy feature corresponding to the identification information by using the transformation parameter, divides the transformed noisy feature into a plurality of subsets by using k-means method, calculates a mean vector and a covariance matrix of the noisy feature contained in the subsets for each of the divided subsets, calculates a Gaussian mixing coefficient in proportion to a size of each of the subsets, and calculates a Gaussian mixture model represented by the mean vector, the covariance matrix, and the Gaussian mixing coefficient as an initial value of the second model parameter; and
a model updating unit configured to update the mean vector, the covariance matrix, and the Gaussian mixing coefficient by using the expectation-maximization algorithm so that the second likelihood is set to maximum, when the Gaussian mixture model calculated by the model initializing unit is set to the initial value.

5. A computer program product having a computer readable medium including programmed instructions for creating a speaker model that represents a distribution of features extracted from a speech of a standard speaker, wherein the instructions, when executed by a computer, cause the computer to perform:
calculating a first model parameter indicating a parameter of the speaker model for causing a first likelihood for the clean feature representing a feature of a speech of the speaker recorded in a noiseless environment to maximum, and calculating a transformation parameter for causing the first likelihood to maximum, the transformation parameter transforming, for each of the speakers, a distribution of the clean feature corresponding to the identification information for identifying each of the speakers to a distribution represented by the speaker model of the first model parameter; and
transforming a noisy feature representing a feature of a speech of the speaker recorded in a noisy environment corresponding to the identification information for each of the speakers by using the transformation parameter, and calculating a second model parameter indicating a parameter of the speaker model for causing a second likelihood for the transformed noisy feature to maximum.

\* \* \* \* \*